Oct. 22, 1929.  L. F. ARMSTRONG  1,732,549
WRENCH FOR TOOL HOLDERS
Filed Feb. 17, 1928
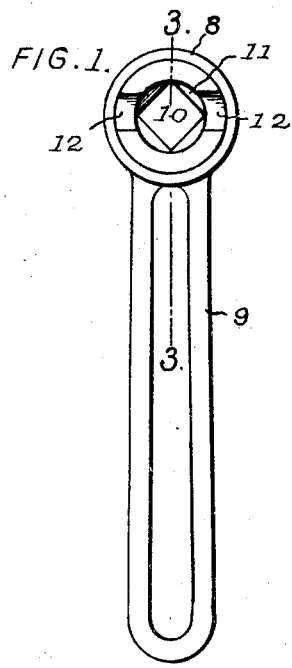
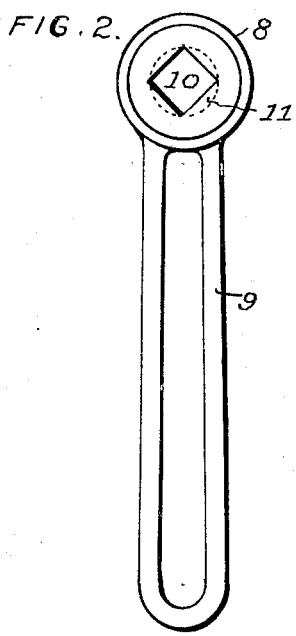
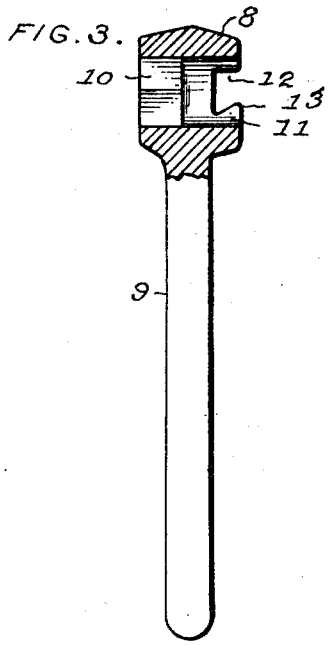
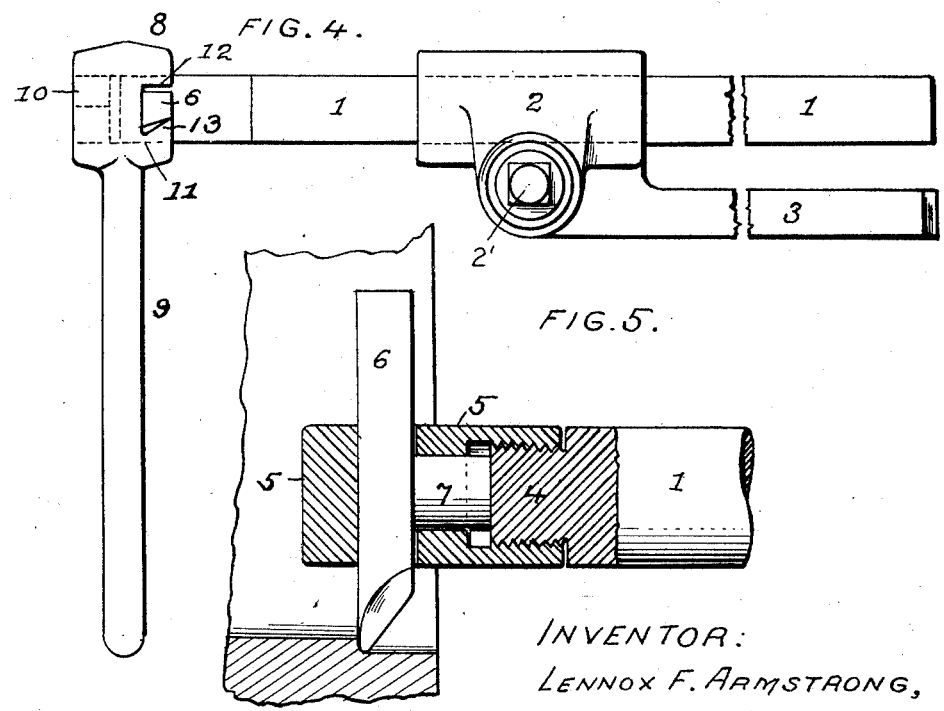
INVENTOR:
LENNOX F. ARMSTRONG,
by Robert Burns, ATT'Y.

Patented Oct. 22, 1929

1,732,549

UNITED STATES PATENT OFFICE

LENNOX F. ARMSTRONG, OF CHICAGO, ILLINOIS, ASSIGNOR TO ARMSTRONG BROS. TOOL CO., OF CHICAGO, ILLINOIS, A CORPORATION OF ILLINOIS

WRENCH FOR TOOL HOLDERS

Application filed February 17, 1928. Serial No. 255,046.

This invention relates to a wrench structure for manipulating the adjustable members of boring tool holders of the type described in my companion application for patent, Serial No. 255,045, filed Feb. 17, 1928, and this improvement has for its object:

To provide a structural formation of a wrench head adapted for individual operative engagement with the non-circular head of the clamping bolt of the boring tool holder of the above mentioned type, and a like individual and direct operative engagement with the cutter bar of such holder in a clamping of said bar in place, with such last mentioned operation effectively attained without liability to damage to the cutting edge of said cutter bar, all as will hereinafter more fully appear.

In the accompanying drawing:—

Figs. 1 and 2 are elevations of the opposite faces of a boring tool holder wrench of the present type.

Fig. 3 is a longitudinal section of same on line 3,—3, Fig. 1, illustrating the present invention.

Fig. 4, is a top view illustrating the wrench in its operative position on the forward end of the cutter carrying bar and in operative engagement with said cutter.

Fig. 5 is an enlarged detail longitudinal section showing the construction at the forward end of the cutter carrying bar for clamping the cutter in place.

Like reference numerals indicate like parts in the several views.

This invention is intended for use on the type of boring tool holders described in the James Armstrong Patent No. 535,440 of March 12, 1895, and in my aforesaid companion application Serial No. 255,045. In both of which disclosures the cylindrical cutter carrying bar 1 is clamped in a longitudinal slitted tubular holding hub 2 of the headstock of the holder, and in lateral relation to an attaching shank 3 adapted to fit and be held in the tool post of a boring or like machine. At its forward end the cutter carrying bar is formed with a forwardly extending screw threaded shank 4 for adjustable engagement with a screw threaded orifice formed in the rear portion of a cylindrical holding cap piece or nut 5. The cap piece or nut 5 is formed with a transverse orifice near its forward end for the reception of a cutter bar or blade 6 of the usual trapezoidal form in cross section shown in Fig. 4, in which the acute corner of the bar or blade constitutes the cutting edge of the same. With the described formation and arrangement of parts the bar blade 6 is firmly clamped in place by the rearward movement of the cap piece or nut 5 in connection with a pressure block 7 interposed between the forward end of the aforesaid screw threaded shank 4 of the carrier bar and the cutter bar or blade 6, as illustrated more particularly in Fig. 5.

As usual in this type of wrenches, the wrench head 8 is provided with an operating handle 9 and is formed with a transverse bore, one portion 10, of which is of a square or like non-circular formation adapted for operative engagement with the operating head 2' of the clamping bolt by which a clamping action of the aforesaid tubular hub 2, upon the cutter carrying bar 1, is effected. The other portion 11, of said bore is of a circular formation adapted to fit over the forward end of the cap piece or nut 5 aforesaid, with the surrounding wall of such circular portion of said bore formed with transverse recesses 12, open at the rear end of the wrench head with such recesses adapted to straddle and engage the cutter bar or blade 6, to effect a rotation of the cap piece or nut 5, in a manipulating of the parts to a clamping of the cutter bar or blade 6 in place, or a release of the same in the continued use of the appliance.

The material part of this invention relates wholly to a special formation of one or both cutter engaging recesses 12, so that in an operative engagement of any one of the recesses 12, with the cutter bar or blade 6, all liability of marring or breaking of the cutting edge of such cutter bar or blade is prevented. To such end the side wall of the recess 12 is formed in a line oblique to the longitudinal axis of the wrench head, with its oblique inclination of a greater degree than that of the cutting face of the cutter bar or blade 6, and so that a bearing point 13 for said wall upon the cutting face is provided at a point entirely remote from the cutting edge of the cutter bar or blade 6, as more particularly illustrated in Fig. 4.

Having thus fully described my invention what I claim and desire to secure by Letters Patent is:—

A wrench for boring bar tool holders of the type described, comprising a handled wrench head formed with a transverse bore, one portion of which is non-circular in form and adapted to fit upon the cap nut of a tool holder and the side wall of another portion of said bore formed with an open ended recess for engagement with a cutter bar, a side wall of said recess having a bevel formation of a greater acuteness than a complementary bevel of the cutter blade to attain operative engagement of the parts solely at rear part of said beveled surface of the cutter bar.

In testimony whereof I hereunto affix my signature.

LENNOX F. ARMSTRONG.